United States Patent
Ota et al.

(10) Patent No.: US 7,183,347 B2
(45) Date of Patent: Feb. 27, 2007

(54) DIP MOLDINGS, COMPOSITION FOR DIP MOLDING AND METHOD FOR PRODUCING DIP MOLDINGS

(75) Inventors: Hisanori Ota, Kawasaki (JP); Toshihiro Sakakibara, Kawasaki (JP)

(73) Assignee: Zeon Corporation, Tokyo (JP)

(*) Notice: Subject to any disclaimer, the term of this patent is extended or adjusted under 35 U.S.C. 154(b) by 4 days.

(21) Appl. No.: 10/415,095

(22) PCT Filed: Oct. 29, 2001

(86) PCT No.: PCT/JP01/09480

§ 371 (c)(1),
(2), (4) Date: Apr. 30, 2003

(87) PCT Pub. No.: WO02/36665

PCT Pub. Date: May 10, 2002

(65) Prior Publication Data

US 2004/0010067 A1    Jan. 15, 2004

(30) Foreign Application Priority Data

Oct. 30, 2000  (JP) ............................. 2000-330936
Feb. 28, 2001  (JP) ............................. 2001-053748

(51) Int. Cl.
    *C08L 3/18*  (2006.01)
(52) U.S. Cl. ............... 524/430; 524/432; 524/478; 524/560; 524/562; 525/562; 2/168; 128/844
(58) Field of Classification Search ............... 524/430, 524/432, 478, 560, 562; 525/478; 2/168; 128/844
See application file for complete search history.

(56) References Cited

U.S. PATENT DOCUMENTS 2,880,189 A    3/1959    Miller et al.
4,102,844 A *  7/1978    Schwinum et al. ......... 524/745

FOREIGN PATENT DOCUMENTS

| CN | 1061517 A | 6/1991 |
|---|---|---|
| EP | 0 486 183 A1 * | 5/1992 |
| EP | 486183 A1 | 5/1993 |
| EP | 559150 A1 | 9/1993 |
| GB | 1 480 112 * | 7/1977 |
| GB | 1480112 A | 7/1977 |
| JP | 50-59440 | 5/1975 |
| JP | 4-292630 | 10/1992 |
| JP | 6-182788 | 7/1994 |
| JP | 7-60766 A | 3/1995 |
| WO | WO 97/48765 | 12/1997 |

OTHER PUBLICATIONS

A copy of Chinese Patent Office Action for corresponding Chinese Patent Application No. 018214940 dated Oct. 15, 2004 with English translation.

A copy of the Japanese Patent Office Action for corresponding Japanese patent application No. 2002-539417, dated May 10, 2006, with partial English translation.

* cited by examiner

*Primary Examiner*—Robert D. Harlan
(74) *Attorney, Agent, or Firm*—Armstrong, Kratz, Quintos, Hanson & Brooks, LLP

(57) ABSTRACT

The present invention relates to a dip molding, a composition for dip molding, and a method for producing a dip molding. The dip molding is molded from a conjugated diene based rubber latex, crosslinked by a water-soluble multivalent metal salt, and contains substantially none of any of a sulfur-containing vulcanizing agent, a vulcanization accelerator for the vulcanizing agent, and zinc oxide. The dip molding has very few pinholes, has good feel, and has sufficient strength.

9 Claims, No Drawings

DIP MOLDINGS, COMPOSITION FOR DIP MOLDING AND METHOD FOR PRODUCING DIP MOLDINGS

TECHNICAL FIELD

The present invention relates to a dip molding, a composition for dip molding, and a method for producing a dip molding and, more particularly, a dip molding that has very few pinholes, has good feel, and has sufficient strength, a composition for dip molding that is suitable as a starting material for the molding, and a method for producing the molding efficiently.

BACKGROUND ART

Conventionally, rubber gloves are widely used in domestic work, various industries such as the food industry and electronic component manufacturing, and medical care (in particular, for surgery). The rubber gloves are required to be free of pinholes, have good feel so as to provide ease of work, and not to break during work.

As the rubber gloves, those obtained by dip molding from a natural rubber latex are commonly used. However, there is a possibility that the natural rubber latex gloves might cause allergy in some users due to trace amounts of protein present in a rubber component and, therefore, gloves made of a synthetic rubber latex such as, for example, an acrylonitrile-butadiene copolymer latex, which are free of the above-mentioned possibility, have been proposed.

U.S. Pat. No. 2,880,189 discloses a composition for dip molding, the composition comprising a water-insoluble multivalent metal oxide and an acrylonitrile-butadiene copolymer latex modified with a specific carboxyl group neutralized with ammonia. Although a dip molding obtained from such a composition for dip molding has very little possibility of causing allergy, since there are many pinholes it is necessary to dispose of a considerable number of defective products by screening. Furthermore, the dip molding obtained from the composition for dip molding, which contains no sulfur, tends to have a low tensile stress at 300% elongation (good feel), but poor tensile strength (possibility of breaking during work).

WO 97/48765 discloses gloves that are dip-molded using a carboxyl-modified acrylonitrile-butadiene copolymer latex, ammonium casein, sulfur, and a vulcanization accelerator, and using no zinc oxide. Although such a dip molding has a comparatively low tensile stress at 300% elongation and excellent tensile strength, there are many pinholes.

In the production of a dip molding, in order to vulcanize a dip molding layer formed on the surface of a dip molding mold, the dip molding layer is usually subjected to a vulcanization step in which it is thermally treated at a temperature of 100° C. to 130° C. for about 30 minutes to about 1 hour. Such a thermal treatment requires a large amount of thermal energy, and there is therefore a desire for a more energy-efficient production method.

DISCLOSURE OF INVENTION

It is an object of the present invention to provide a dip molding that has very few pinholes, has good feel, and has sufficient strength. It is another object of the present invention to provide a composition for dip molding that is suitable as a starting material for the above molding. It is yet another object of the present invention to provide a method for producing the above molding with high productivity.

As a result of an intensive investigation by the present inventors in order to achieve the above-mentioned objects, it has been found that controlling the pH of a conjugated diene based rubber latex obtained by copolymerization of a conjugated diene monomer and an ethylenically unsaturated acid monomer can give a dip molding exhibiting satisfactory performance without sulfur vulcanization, and the present invention has been accomplished based on such a finding.

That is, one aspect of the present invention provides the following solution means.

A dip molding molded from a conjugated diene based rubber latex obtained by copolymerization of a conjugated diene monomer and an ethylenically unsaturated acid monomer, wherein the dip molding is crosslinked by a water-soluble multivalent metal salt, and molding is carried out using substantially none of any of a sulfur-containing vulcanizing agent, a vulcanization accelerator for the vulcanizing agent, and zinc oxide.

Another aspect of the present invention provides the following solution means.

A composition for dip molding, the composition comprising a conjugated diene based rubber latex obtained by copolymerization of a conjugated diene monomer and an ethylenically unsaturated acid monomer, wherein the composition has a pH of at least 8.5, and contains substantially none of any of a sulfur-containing vulcanizing agent, a vulcanization accelerator for the vulcanizing agent, and zinc oxide.

Yet another aspect of the present invention provides the following solution means.

A method for producing a dip molding comprising a step of adhering to a dip molding mold a latex coagulating agent comprising a water-soluble multivalent metal salt, a step of forming a dip molding layer on the surface of the mold by immersing the mold in a composition for dip molding comprising a conjugated diene based rubber latex obtained by copolymerization of a conjugated diene monomer and an ethylenically unsaturated acid monomer, the composition having a pH of at least 8.5 and containing substantially none of any of a sulfur-containing vulcanizing agent, a vulcanization accelerator for the vulcanizing agent, and zinc oxide, and a step of detaching the dip molding layer after drying, in that order.

BEST MODE FOR CARRYING OUT THE INVENTION

The present invention is explained in detail below.

The 'conjugated diene based rubber latex' referred to in the present invention means a conjugated diene-ethylenically unsaturated acid copolymer rubber latex obtained by polymerization of a monomer mixture containing as essential components a conjugated diene monomer and an ethylenically unsaturated acid monomer. The monomer mixture preferably contains, among the two types of monomers, the conjugated diene monomer in a larger amount than that of the ethylenically unsaturated acid monomer. Furthermore, the monomer mixture may contain an additional ethylenically unsaturated monomer that can copolymerize with the above-mentioned two types of monomers.

The conjugated diene based rubber latex used in the present invention is preferably a copolymer latex obtained by polymerization of a monomer mixture comprising 30 to 90 wt % of the conjugated diene monomer, 0.1 to 20 wt % of the ethylenically unsaturated acid monomer, and 0 to 69.9 wt % of the additional ethylenically unsaturated monomer that can copolymerize with the above monomers.

The conjugated diene monomer is not particularly limited, and examples thereof include 1,3-butadiene, isoprene, 2,3-dimethyl-1,3-butadiene, 2-ethyl-1,3-butadiene, 1,3-pentadiene, and chloroprene. These conjugated diene monomers may be used singly or in a combination of two or more types, and 1,3-butadiene or isoprene is preferably used.

The amount of conjugated diene monomer used is preferably 30 to 90 wt % of the monomer mixture, more preferably 40 to 85 wt %, and particularly preferably 50 to 80 wt %. When it is less than 30 wt %, the dip molding obtained has a hard feel, and on the other hand when it is more than 90 wt %, the gloves do not retain their shape and the tensile strength tends to be low.

The ethylenically unsaturated acid monomer is not particularly limited as long as it is an ethylenically unsaturated monomer having an acidic group such as a carboxyl group, a sulfonic acid group, or an acid anhydride group, and examples thereof include an ethylenically unsaturated monocarboxylic acid monomer such as acrylic acid or methacrylic acid; an ethylenically unsaturated polycarboxylic acid monomer such as itaconic acid, maleic acid, or fumaric acid; an ethylenically unsaturated polycarboxylic acid anhydride such as maleic anhydride or citraconic anhydride; an ethylenically unsaturated sulfonic acid monomer such as styrenesulfonic acid; and an ethylenically unsaturated polycarboxylic acid partial ester monomer such as monobutyl fumarate, monobutyl maleate, or mono-2-hydroxypropyl maleate. These ethylenically unsaturated acid monomers can also be used in the form of an alkali metal salt or an ammonium salt. These ethylenically unsaturated acid monomers may be used singly or in a combination of two or more types. Among these ethylenically unsaturated acid monomers, it is preferable to use an ethylenically unsaturated carboxylic acid, it is more preferable to use an ethylenically unsaturated monocarboxylic acid, and it is particularly preferable to use methacrylic acid.

The amount of ethylenically unsaturated acid monomer used is preferably 0.1 to 20 wt % of the monomer mixture, more preferably 1 to 15 wt %, and particularly preferably 2 to 6 wt %. When it is less than 0.1 wt %, the tensile strength of the dip molding is low, and on the other hand when it is more than 20 wt %, the dip molding has a hard feel.

With regard to the additional ethylenically unsaturated monomer that can copolymerize with the conjugated diene monomer and the ethylenically unsaturated acid monomer, examples thereof include an ethylenically unsaturated nitrile monomer such as acrylonitrile, methacrylonitrile, fumaronitrile, α-chloroacrylonitrile, or α-cyanoethylacrylonitrile; a vinyl aromatic monomer such as styrene, an alkylstyrene, or vinylnaphthalene; a fluoroalkyl vinyl ether such as fluoroethyl vinyl ether; an ethylenically unsaturated amide monomer such as (meth)acrylamide, N-methylol(meth)acrylamide, N,N-dimethylol(meth)acrylamide, N-methoxymethyl (meth) acrylamide, or N-propoxymethyl(meth)acrylamide; an ethylenically unsaturated carboxylic acid ester monomer such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth) acrylate, hydroxyethyl (meth)acrylate, hydroxypropyl (meth)acrylate, glycidyl (meth)acrylate, or dimethylaminoethyl (meth)acrylate; and a crosslinking monomer such as divinylbenzene, polyethylene glycol di(meth)acrylate, polypropylene glycol di(meth)acrylate, trimethylolpropane tri(meth)acrylate, or pentaerythritol (meth)acrylate. These ethylenically unsaturated monomers may be used singly or in a combination of two ore more types.

Among these monomers, it is preferable to use an ethylenically unsaturated nitrile monomer, and in particular acrylonitrile.

The amount of ethylenically unsaturated monomer used is preferably 0 to 69.9 wt % of the monomer mixture, more preferably 0 to 59 wt %, and particularly preferably 14 to 48 wt %. When it is more than 69.9 wt %, the dip molding obtained has a hard feel.

The monomer mixture used for producing the conjugated diene based rubber latex particularly preferably comprises 1,3-butadiene, acrylonitrile, and methacrylic acid, the composition thereof being preferably 40 to 79 wt %, 20 to 45 wt %, and 1 to 15 wt %, respectively, and more preferably 54 to 73 wt %, 25 to 40 wt %, and 2 to 6 wt %, respectively.

The conjugated diene based rubber latex used in the present invention is usually produced by an emulsion-polymerization method. The polymerization temperature during emulsion-polymerization is not particularly limited, but it is particularly preferably 45° C. or less since the latex can be produced stably and a dip molding having high mechanical strength and a soft feel can be obtained. The polymerization temperature during emulsion-polymerization is more preferably in the range of 10° C. to 45° C.

In the production of the conjugated diene based rubber latex, the method for adding the monomer mixture is not particularly limited, and any method can be employed such as a method in which the monomer mixture is charged all at once into a polymerization reactor, a method in which the monomer mixture is continuously supplied to the polymerization reactor, or a method in which part of the monomer mixture is charged into the polymerization reactor and the rest of the monomer is continuously supplied to the polymerization reactor.

A polymerization initiator used in the production of the conjugated diene based rubber latex is not particularly limited, but specific examples thereof include an inorganic peroxy compound such as sodium persulfate, potassium persulfate, ammonium persulfate, potassium perphosphate, or hydrogen peroxide; an organic peroxy compound such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, or benzoyl peroxide; and an azo compound such as azobisisobutyronitrile, azobis-2,4-dimethylvaleronitrile, or methyl azobisisobutyrate. These polymerization initiators may be used singly or in a combination of two or more types. An inorganic or organic peroxy compound initiator is preferably used since a latex can be produced stably and a dip molding having a high mechanical strength and a soft feel can be obtained. The amount of polymerization initiator used depends to some extent on the type thereof, but it is preferably 0.01 to 1.0 parts by weight based on 100 parts by weight of the monomer mixture.

The inorganic or organic peroxy compound initiator can be used in combination with a reducing agent as a redox polymerization initiator. This reducing agent is not particularly limited, and examples thereof include a compound containing a metal ion in a reduced state such as ferrous sulfate or cuprous naphthenate; a sulfonate compound such as sodium methanesulfonate; and an amine compound such as dimethylaniline or sodium ethylenediaminetetraacetate. These reducing agents may be used singly or in a combination of two or more types. The amount of reducing agent used depends to some extent on the type thereof, but is preferably 0.03 to 10 parts by weight based on 1 part by weight of the peroxy compound.

Among these initiators, it is preferable to use the redox polymerization initiator in which the peroxy compound initiator and the reducing agent are combined.

An emulsifier used in the production of the conjugated diene based rubber latex is not particularly limited, but examples thereof include a nonionic emulsifier such as a polyoxyethylene alkyl ether, a polyoxyethylene alkylphenol ether, a polyoxyethylene alkyl ester, or a polyoxyethylene sorbitan alkyl ester; an anionic emulsifier such as a salt of a fatty acid, for example, myristic acid, palmitic acid, oleic acid, or linolenic acid, a salt of an alkylbenzenesulfonic acid, for example, sodium dodecylbenzenesulfonate, a higher alcohol sulfate ester, or an alkylsulfosuccinate salt; a cationic emulsifier such as an alkyltrimethylammonium chloride, a dialkylammonium chloride, or benzylammonium chloride; and a copolymerizable emulsifier such as a sulfo ester of an α,β-unsaturated carboxylic acid, a sulfate ester of an α,β-unsaturated carboxylic acid, or a sulfoalkyl aryl ether. An anionic emulsifier or a nonionic emulsifier is particularly preferably used. These emulsifiers may be used singly or in a combination of two or more types. Since the amount of emulsifier used affects the chemical stability of the latex for dip molding, it is usually used in a range of 0.1 to 9 wt % based on the monomer mixture.

In the emulsion polymerization, a polymerization adjuvant (polymerization auxiliary) such as a molecular weight adjusting agent, a particle size adjusting agent, an antioxidant, a chelating agent, or an oxygen scavenger can be used as necessary.

The particle size of the conjugated diene based rubber latex is preferably 60 to 300 nm, and more preferably 80 to 150 nm, as a number-average particle size measured by observation using a transmission electron microscope. This particle size can be adjusted to a desired value by, for example, regulating the amounts of emulsifier and polymerization initiator used.

The composition for dip molding of the present invention comprises such a conjugated diene based rubber latex, and can be obtained by adjusting the pH thereof to at least 8.5, preferably 9.5 to 13, and more preferably 10.5 to 12, and making it contain substantially none of any of a sulfur-containing vulcanizing agent, a vulcanization accelerator for the vulcanizing agent, and zinc oxide. When the pH of the composition for dip molding is less than 8.5, the strength of the dip molding is degraded, and it is very difficult to adjust the pH so that it is more than 13.

The sulfur-containing vulcanizing agent referred to in the present invention is a material that can crosslink high molecular weight chains of a plastic conjugated diene based rubber into a net-like structure, and sulfur is representative thereof. The sulfur-containing vulcanizing agents can be roughly divided into inorganic sulfur-containing vulcanizing agents and organic sulfur-containing vulcanizing agents; specific examples of the former include sulfur (powdered sulfur, flowers of sulfur, acidless sulfur, precipitated sulfur, colloidal sulfur, polymeric sulfur, insoluble sulfur) and sulfur monochloride, and specific examples of the latter include those that can release active sulfur by thermal dissociation, such as morpholine disulfide and an alkylphenol disulfide. Specific examples of other organic sulfur-containing vulcanizing agents are listed in 'Gomu Kogyo Binran (Rubber Industry Handbook) 4th Edition, III Chemical Additives, 1. Vulcanizing Agents', ed. by the Society of Rubber Industry, Japan, (published by the Society of Rubber Industry, Japan, January, 1994).

The vulcanization accelerator referred to in the present invention is a material that accelerates a vulcanization reaction in the presence of a sulfur-containing vulcanizing agent, thereby exhibiting effects in shortening the vulcanization time, lowering the vulcanization temperature, or decreasing the sulfur-containing vulcanizing agent. Specific examples of the vulcanization accelerator include a thiazole-based vulcanization accelerator such as zinc 2-mercaptobenzothiazole, a thiourea-based vulcanization accelerator such as diphenylthiourea, a guanidine-based vulcanization accelerator such as diphenylguanidine, and aldehyde/ammonia and aldehyde/amine-based vulcanization accelerators such as hexamethylenetetramine. Specific examples of other vulcanization accelerators are listed in 'Gomu Kogyo Binran (Rubber Industry Handbook) 4th Edition, III Chemical Additives, 3. Vulcanization Accelerators', ed. by the Society of Rubber Industry, Japan, (published by the Society of Rubber Industry, Japan, January, 1994).

The presence of a sulfur-containing vulcanizing agent increases the number of pinholes in a dip molding. 'Containing substantially none' of the sulfur-containing vulcanizing agent means particularly preferably containing none at all, but it can be in a range that does not impair the objects of the present invention, for example, preferably at most 0.4 parts by weight based on 100 parts by weight of the solids portion of the conjugated diene based rubber latex, more preferably at most 0.2 parts by weight, yet more preferably less than 0.1 parts by weight, and particularly preferably less than 0.05 parts by weight.

The presence of a vulcanization accelerator for the vulcanizing agent increases the number of pinholes in a dip molding. 'Containing substantially none' of the vulcanization accelerator means particularly preferably containing none at all, but it can be in a range that does not impair the objects of the present invention, for example, preferably at most 0.4 parts by weight based on 100 parts by weight of the solids portion of the conjugated diene based rubber latex, more preferably at most 0.2 parts by weight, and yet more preferably less than 0.1 parts by weight.

The presence of zinc oxide increases the number of pinholes in a dip molding. 'Containing substantially none' of the zinc oxide means particularly preferably containing none at all, but it can be in a range that does not impair the objects of the present invention, for example, preferably at most 0.7 parts by weight based on 100 parts by weight of the solids portion of the conjugated diene based rubber latex, more preferably at most 0.3 parts by weight, and yet more preferably at most 0.1 parts by weight.

'Molding being carried out using substantially none of any of a sulfur-containing vulcanizing agent, a vulcanization accelerator for the vulcanizing agent, and zinc oxide' or 'containing substantially none of any of a sulfur-containing vulcanizing agent, a vulcanization accelerator for the vulcanizing agent, and zinc oxide' means particularly preferably using or containing none of any of a sulfur-containing vulcanizing agent, a vulcanization accelerator for the vulcanizing agent, and zinc oxide, but they can be contained in a range that does not impair the objects of the present invention, for example, based on 100 parts by weight of the solids portion of the conjugated diene based rubber latex, the sulfur-containing vulcanizing agent being at most 0.4 parts by weight, the vulcanization accelerator for the vulcanizing agent being at most 0.4 parts by weight, and the zinc oxide being at most 0.7 parts by weight, and more preferably the sulfur-containing vulcanizing agent being at most 0.2 parts by weight, the vulcanization accelerator for the vulcanizing agent being at most 0.2 parts by weight, and the zinc oxide being at most 0.3 parts by weight.

In order to adjust the pH of the composition for dip molding of the present invention, a basic substance is added. Examples of the basic substance include a hydroxide of an alkali metal such as lithium hydroxide, sodium hydroxide or potassium hydroxide; a carbonate of an alkali metal such as sodium carbonate or potassium carbonate; a hydrogen carbonate of an alkali metal such as sodium hydrogen carbonate; ammonia; and an organic amine compound such as trimethylamine or triethanolamine. The alkali metal hydroxides and/or ammonia are particularly preferable, and the alkali metal hydroxides are more preferable. These basic substances are usually added in the form of a solution, and preferably an aqueous solution, having a concentration of 1 to 40 wt %, and preferably 2 to 15 wt %, in order to prevent formation of aggregates during addition.

With regard to a method for adjusting the pH of the composition for dip molding, examples thereof include a method in which the pH of the conjugated diene based rubber latex is adjusted in advance and a method in which the pH is adjusted after mixing the conjugated diene based rubber latex with another additive if desired, but the method is not particularly limited as long as the pH of the composition for dip molding can finally be in the desired range.

The total solids content of the composition for dip molding is usually 5 to 50 wt %, preferably 10 to 45 wt %, and more preferably 20 to 40 wt %. When this content is too low, it is difficult to obtain a dip molding having a desired thickness, and on the other hand when it is too high, it is difficult to handle the composition for dip molding due to its high viscosity, or the thickness of the dip molding tends to be uneven.

The composition for dip molding of the present invention may contain a standard additive such as an antioxidant, a dispersant, a viscosity increasing agent, a pigment, a filler, or a softening agent in a range that does not impair the objects of the present invention. It is also possible to use, in combination, another latex such as a natural rubber latex or an isoprene rubber latex as long as the objects of the present invention are not impaired.

It is not necessary for the composition for dip molding of the present invention to be subjected to an aging step that is usually carried out for a conventional composition for dip molding. Since a dip molding having sufficient strength can be obtained without carrying out aging, the production of a dip molding is simple.

The water-soluble multivalent metal salt used in the present invention is a salt of a metal of groups 2, 12, and 13 of the periodic table and has a solubility of at least 5 parts by weight in 100 parts by weight of water at 25° C., and preferably at least 20 parts by weight. The water-soluble multivalent metal salt has the function of degrading the stability of latex particles dispersed in an aqueous phase to thereby coagulate the latex particles.

Specific examples of the water-soluble multivalent metal salt include a halide such as barium chloride, calcium chloride, magnesium chloride, zinc chloride, or aluminum chloride; a nitrate such as barium nitrate, calcium nitrate, or zinc nitrate; an acetate such as barium acetate, calcium acetate, or zinc acetate; and a sulfate such as calcium sulfate, magnesium sulfate, or aluminum sulfate. In particular, calcium chloride and calcium nitrate are preferable. These water-soluble multivalent metal salts are preferably used in the form of an aqueous solution. The concentration of the aqueous solution depends on the type of water-soluble multivalent metal salt, but is usually 5 to 70 wt %, and preferably 20 to 50 wt %. The temperature of the aqueous solution when used is usually 0° C. to 90° C., and preferably 30° C. to 70° C.

The dip molding of the present invention can be obtained by a production method comprising a step of forming a dip molding layer on the surface of a dip molding mold using a composition for dip molding and a latex coagulating agent comprising a water-soluble multivalent metal salt, and a step of detaching the dip molding layer after drying, in that order.

The step of forming a dip molding layer can be roughly divided into an anode coagulant dipping process and a Teague coagulant dipping process. It is preferable to form a dip molding layer by the former method because the dip molding thus obtained has a less uneven thickness.

The anode coagulant dipping process comprises a step of immersing a dip molding mold in a latex coagulation liquid comprising a water-soluble multivalent metal salt so as to adhere the latex coagulation liquid to the surface of the mold, and a step of immersing the mold in the composition for dip molding of the present invention so as to form a dip molding layer on the surface of the mold, in that order. The Teague coagulant dipping process comprises a step of immersing a dip molding mold in the composition for dip molding of the present invention so as to form a coating of the composition for dip molding on the surface of the mold, and a step of immersing the mold in a latex coagulation liquid comprising a water-soluble multivalent metal salt so as to form a dip molding layer on the surface of the mold, in that order. It is also possible to form a dip molding layer having a large film thickness by repeating one of the two methods or repeating the two methods alternately.

The mold temperature of the dip molding mold and the temperature of the composition for dip molding when carrying out dip molding are usually room temperature to 90° C., and preferably 40° C. to 80° C. The period of time during which the dip molding mold is immersed in the latex coagulation liquid and the period of time during which the dip molding mold to which the latex coagulation liquid has been adhered is immersed in the composition for dip molding in the anode coagulant dipping process can be adjusted appropriately so that a dip molding layer having a desired thickness can be obtained.

The dip molding layer thus obtained is preferably washed with water before drying. The washing with water here means immersing the dip molding layer in water, and preferably hot water at 40° C. to 70° C., for about 2 to about 60 minutes so as to remove water-soluble impurities (for example, surpluses of the emulsifier, water-soluble multivalent metal salt, etc.) This operation may be carried out after drying the dip molding layer, but is preferably carried out before drying since water-soluble impurities can be removed more efficiently. Carrying out this operation can outstandingly improve the tensile strength of the dip molding.

The dip molding layer thus obtained has a high water content and needs to be dried. The drying is carried out so that the water content of the dip molding layer becomes preferably 5 wt % or less, and more preferably 2 wt % or less. With regard to the drying method, a method involving external heating by means of infrared radiation or hot air, or internal heating by means of high-frequency waves can be employed. The drying by means of hot air is particularly preferable. The drying temperature is usually 60° C. to 95° C., and preferably 70° C. to 85° C., and the drying time is usually about 10 to about 120 minutes.

Since the drying can impart sufficient strength to the dip molding layer, detaching this layer from the dip molding mold can give a dip molding. As a method for detachment, a method in which it is detached from the dip molding mold by hand or a method in which it is detached by means of water pressure or compressed air pressure is employed.

Prior to detachment, it may be subjected to a thermal treatment at a temperature of 100° C. to 150° C. for 10 to 120 minutes, but the composition for dip molding of the present invention can give a dip molding having sufficient strength by only the above-mentioned drying. Furthermore, subsequent to detachment, it may be subjected to a further thermal treatment at a temperature of 60° C. to 120° C. for 10 to 120 minutes if desired.

In the dip molding of the present invention, the ratio of the number of moles of the multivalent metal originating from the water-soluble multivalent metal salt used relative to the number of moles of the acid group of the bonded ethylenically unsaturated acid in the conjugated diene based rubber latex is preferably 0.2 to 1.5, more preferably 0.3 to 1.3, and particularly preferably 0.35 to 0.8. When this ratio is in this range, the dip molding has excellent tensile strength.

This ratio is determined by dividing a value obtained by incinerating the dip molding at a high temperature and converting the incinerated portion into a metal chloride by hydrochloric acid so as to quantitatively determine the number of moles of the multivalent metal originating from the included water-soluble multivalent metal salt, by the number of moles of the acid group of the bonded ethylenically unsaturated acid in the conjugated diene based rubber latex forming the dip molding. When quantitatively determining the number of moles of the multivalent metal, if there is contamination by a component that does not originate from the water-soluble multivalent metal salt but can be quantitatively determined as the same multivalent metal, the amount thereof is corrected before the calculation.

This ratio can be adjusted to a desired value by appropriately adjusting the amount of bonded ethylenically unsaturated acid in the conjugated diene based rubber latex, the pH of the composition for dip molding, the concentration of the water-soluble multivalent metal salt, and/or the dipping conditions, etc.

The dip molding of the present invention can easily achieve a tensile stress at 300% elongation of less than 4.5 MPa, preferably less than 3.5 MPa, and more preferably less than 3.0 MPa, excellent feel, and a tensile strength of at least 20 MPa, preferably at least 25 MPa, and more preferably at least 30 MPa.

The tensile stress and the tensile strength referred to here mean those measured by a method described in examples.

The dip molding of the present invention can be produced so as to have a thickness of about 0.1 to about 3 mm, and can be used particularly suitably as a thin product having a thickness of about 0.1 to about 0.3 mm. Specifically, it is suitable as a medical product such as a baby's bottle nipple, a dropper, a tube, or a hot-water bottle; a toy or sports equipment such as a balloon, a doll, or a ball; an industrial product such as a pressure molded bag or a gas storage bag; surgical, domestic, agricultural, fishery, and industrial gloves; and a finger stall. It is particularly suitable as thin surgical gloves.

The present invention is explained in further detail below by reference to examples. 'Parts' and '%' in the examples are on a weight basis unless otherwise specified.

(Properties Evaluation Methods)

(pH)

Measured at 25° C. using a pH meter (M12: manufactured by Horiba, Ltd.). The latex measured had a solids content of 45%, and the composition for dip molding measured had a solids content of 30%.

(Tensile Stress at 300% Elongation and Tensile Strength)

In accordance with ASTM-D412, a dip-molded rubber glove was stamped using a Die-c dumbbell to make a test piece. The test piece was subjected to measurements of tensile stress at 300% elongation and tensile strength at break at a tensile speed of 500 mm/min using a Tensilon universal tester (RTC-1225A: manufactured by KK Orientech).

The smaller the tensile stress at 300% elongation, the better the feel of the dip molding.

(Rubber Glove Transparency)

The transparency of a dip-molded rubber glove was evaluated visually.

(Number of Pinholes)

A rubber glove was filled with water, and after 30 minutes had passed, the number of pinholes was counted by defining as one pinhole a point where the water inside was leaking on the outer surface of the glove. 100 rubber gloves were prepared per sample, and the total number of pinholes formed in all the rubber gloves was measured.

(Amount of Bonded Methacrylic Acid in Conjugated Diene Based Rubber Latex)

Part of a copolymer latex after completion of the polymerization reaction was sampled, residual unreacted monomer was removed, and a solid rubber was then obtained by coagulation and drying according to JIS K 6392.

About 0.2 g of the solid rubber sample was precisely weighed and dissolved in 100 ml of pyridine, and the solution thus obtained was subjected to neutralization titration of carboxyl groups in the copolymer with a 0.2 N alcoholic solution of potassium hydroxide under an atmosphere of nitrogen using thymolphthalein as an indicator. The amount (wt % basis) of bonded methacrylic acid in the solid rubber was determined from the amount of potassium hydroxide required to neutralize the carboxyl groups in the solid rubber.

(Multivalent Metal/Bonded Methacrylic Acid Molar Ratio in Dip Molding)

0.5 g of a dip molding was precisely weighed, placed in a metal crucible, and treated in an electric furnace at 600° C. for 2 hours so as to incinerate it. The ash portion remaining in the metal crucible was then dissolved using 10 g of a 0.1 N aqueous solution of hydrochloric acid, and the concentration of the multivalent metal chloride originating from the water-soluble multivalent metal dissolved in the solution was measured by capillary electrophoresis with an aqueous solution of calcium chloride as a calibration curve.

The measurement conditions of the capillary electrophoresis were as follows.

| | |
|---|---|
| Measurement equipment: | CAPI-3200 Capillary Electrophoresis System (manufactured by Otsuka Electronics Co., Ltd.) |
| Buffer: | 2 mM imidazole |
| | 5 mM 2-hydroxyisobutyric acid |
| | 100 µl acetic acid/100 ml distilled water |
| Wavelength: | 215 nm |
| Applied voltage: | 25 kV |
| Measurement method: | Indirect method |

The number of moles (R) of the multivalent metal was obtained using equation (1) below.

$$R = \frac{10 \times C}{100 \times M_{CaCl2}} \quad (1)$$

(In the equation, C: concentration of the multivalent metal chloride dissolved in 10 g of the 0.1 N hydrochloric acid (wt %: calcium chloride basis), $M_{CaCl2}$: molecular weight of calcium chloride=111.)

In the case where the conjugated diene based rubber latex alone was used, the number of moles (M) of bonded methacrylic acid contained in the dip molding used here was obtained using equation (2) below.

$$M = \frac{0.5 \times \text{amount (wt \%) of bonded methacrylic acid in the solid rubber}}{100 \times 86} \quad (2)$$

In the case where a component other than the conjugated diene based rubber latex was contained in the composition for dip molding, the amount of rubber component in the dip molding was corrected according to the amount of additional component.

The multivalent metal/bonded methacrylic acid molar ratio in the dip molding was obtained by dividing the value for R by the value for M.

PRODUCTION EXAMPLES 1 TO 6

A pressure-resistant polymerization reactor was flushed with nitrogen and charged with a total of 100 parts of the monomers shown in Table 1, 0.5 parts of t-dodecylmercaptan as the molecular weight adjusting agent, 132 parts of soft water, 1.5 parts of sodium dodecylbenzenesulfonate as the emulsifier, 0.3 parts of potassium persulfate as the polymerization initiator, and 0.05 parts of sodium ethylenediaminetetraacetate as the reducing agent, a reaction was carried out at a polymerization temperature of 37° C. for 30 hours, and the polymerization was then terminated by adding 0.1 parts of sodium dimethyldithiocarbamate as a reaction terminator. The polymerization conversion was at least 97% in all cases.

After removing unreacted monomer from the latex thus obtained, the pH of the copolymer latex was adjusted with 28% aqueous ammonia to give conjugated diene based rubber latexes A to F having a solids content of 45% and a pH of 8.0.

TABLE 1

|  | Production Example | | | | | |
| --- | --- | --- | --- | --- | --- | --- |
|  | 1 | 2 | 3 | 4 | 5 | 6 |
| Monomer composition (parts) | | | | | | |
| Acrylonitrile | 37 | 37 | 37 | 20 | 28 | 37 |
| 1,3-Butadiene | 58 | 59.5 | 61.5 | 72 | 68 | 63 |
| Methacrylic acid | 5 | 3.5 | 1.5 | 8 | 4 | — |
| Conjugated diene based rubber latex | A | B | C | D | E | F |
| Amount of bonded methacrylic acid (wt %) | 5.2 | 3.4 | 1.4 | 8.3 | 4.2 | 0 |

EXAMPLE 1

A composition for dip molding was prepared by adjusting the pH of the conjugated diene based rubber latex A to 10.0 using a 5% aqueous solution of potassium hydroxide and the solids content to 30%.

A dip molding glove mold heated at 60° C. was dipped for 10 seconds in an aqueous solution of latex coagulating agent obtained by mixing 20 parts of calcium nitrate as the water-soluble multivalent metal salt, 0.05 parts of a nonionic emulsifier (Emulgen-810: manufactured by Kao Corporation), and 80 parts of water, then pulled out and dried at 60° C. for 10 minutes so as to adhere the water-soluble multivalent metal salt to the mold surface.

This glove mold coated with the coagulating agent was then immersed in the above-mentioned composition for dip molding for 15 seconds and then pulled out so as to form a dip molding layer on the surface of the glove mold. This was dried at 20° C. for 5 minutes and further at 80° C. for 20 minutes to give a solid coating on the surface of the glove mold. Finally, this solid coating was peeled from the glove mold to give a glove-shaped dip molding having a thickness of 0.1 to 0.2 mm (the same applies below). The results of evaluation of this dip molding are given in Table 2.

EXAMPLE 2

The procedure of Example 1 was repeated except that the pH of the composition for dip molding was adjusted to 11.0 using a 5% aqueous solution of potassium hydroxide. The results are given in Table 2.

EXAMPLE 3

The procedure of Example 2 was repeated except that, after drying at 80° C. for 20 minutes, a dip molding was obtained by a further thermal treatment at 120° C. for 20 minutes. The results are given in Table 2.

EXAMPLE 4

The procedure of Example 2 was repeated except that, before drying at 80° C. for 20 minutes, the glove mold having the dip molding layer was immersed in distilled water at 50° C. for 5 minutes so as to remove water-soluble impurities. The results are given in Table 2.

EXAMPLES 5 AND 6

The procedure of Example 4 was repeated except that each of the conjugated diene based rubber latexes B and C shown in Table 1 was used instead of the conjugated diene based rubber latex A. The results are given in Table 2.

EXAMPLES 7 AND 8

The procedure of Example 4 was repeated except that each of the conjugated diene based rubber latexes D and E shown in Table 1 was used instead of the conjugated diene based rubber latex A. The results are given in Table 2.

EXAMPLE 9

As a white pigment, a titanium oxide liquid dispersion was prepared by mixing 0.1 parts of titanium oxide, 0.05 parts of a 40% aqueous solution of the sodium salt of a β-naphthalenesulfonate-formaldehyde condensate, and 0.1 parts of water in a ball mill. 0.25 parts of this liquid dispersion and 250 parts (corresponding to 100 parts solids content) of the conjugated diene based rubber latex E were mixed, the pH thereof was then adjusted to 11.0 using a 5% aqueous solution of potassium hydroxide, and the solids content thereof was adjusted to 30% to give a composition for dip molding.

The procedure of Example 8 was repeated except that this composition for dip molding was used. The results are given in Table 2.

COMPARATIVE EXAMPLE 1

A vulcanizing agent dispersion was obtained by mixing 1 part of zinc 2-mercaptobenzothiazole, 1.5 parts of sulfur, 1 part of zinc oxide, 0.5 parts of a 40% aqueous solution of the sodium salt of a β-naphthalenesulfonate-formaldehyde condensate, and 3.4 parts of water in a ball mill. 7.4 parts of this vulcanizing agent dispersion and 250 parts (corresponding to 100 parts solids content) of the conjugated diene based rubber latex A were mixed, the pH thereof was then adjusted to 10.0 using a 5% aqueous solution of potassium hydroxide, the solids content thereof was adjusted to 30%, and the mixture thus obtained was aged for 1 day to give a composition for dip molding. The procedure of Example 3 was repeated except that this composition for dip molding was used. The results are given in Table 2.

COMPARATIVE EXAMPLE 2

A vulcanizing agent dispersion was obtained by mixing 1 part of zinc 2-mercaptobenzothiazole, 1.5 parts of sulfur, 0.5 parts of a 40% aqueous solution of the sodium salt of a β-naphthalenesulfonate-formaldehyde condensate, and 2.5 parts of water in a ball mill. 5.4 parts of this vulcanizing agent dispersion and 250 parts (corresponding to 100 parts solids content) of the conjugated diene based rubber latex A were mixed, the pH thereof was then adjusted to 10.0 using a 5% aqueous solution of potassium hydroxide, the solids content thereof was adjusted to 30%, and the mixture thus obtained was aged for 1 day to give a composition for dip molding. The procedure of Example 3 was repeated except that this composition for dip molding was used. The results are given in Table 2.

COMPARATIVE EXAMPLE 3

A zinc oxide dispersion was obtained by mixing 1 part of zinc oxide, 0.5 parts of a 40% aqueous solution of the sodium salt of a β-naphthalenesulfonate-formaldehyde condensate, and 0.5 parts of water in a ball mill. 2.0 parts of this dispersion and 250 parts (corresponding to 100 parts solids content) of the conjugated diene based rubber latex A were mixed, the pH thereof was then adjusted to 10.0 using a 5% aqueous solution of potassium hydroxide, the solids content thereof was adjusted to 30%, and the mixture thus obtained was aged for 1 day to give a composition for dip molding. The procedure of Example 3 was repeated except that this composition for dip molding was used. The results are given in Table 2.

COMPARATIVE EXAMPLE 4

The procedure of Example 1 was repeated except that a composition for dip molding was used in which the pH of the conjugated diene based rubber latex A was not changed from 8.0 and the solids content was adjusted to 30%. The results are given in Table 2. When peeling off the glove-shaped dip molding from the glove mold, the dip molding stretched or broke, and a dip molding having a satisfactory glove shape could not be obtained.

COMPARATIVE EXAMPLE 5

The procedure of Example 2 was repeated except that the conjugated diene based rubber latex F was used instead of the conjugated diene based rubber latex A. The results are given in Table 2. When peeling off the glove-shaped dip molding from the glove mold, the dip molding stretched or broke, and a dip molding having a satisfactory glove shape could not be obtained.

TABLE 2

|  | Example | | | | | | | | | Comparative Example | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 |
| Composition for dip molding |  |  |  |  |  |  |  |  |  |  |  |  |  |  |
| Conjugated diene based rubber latex | A | A | A | A | B | C | D | E | E | A | A | A | A | F |
| Sulfur (parts) | — | — | — | — | — | — | — | — | — | 1.5 | 1.5 | — | — | — |
| Vulcanization accelerator (parts) | — | — | — | — | — | — | — | — | — | 1.0 | 1.0 | — | — | — |
| Zinc oxide (parts) | — | — | — | — | — | — | — | — | — | 1.0 | 0 | 1.0 | — | — |
| Titanium oxide (parts) | — | — | — | — | — | — | — | — | 0.1 | — | — | — | — | — |
| pH of composition | 10.0 | 11.0 | 11.0 | 11.0 | 11.0 | 11.0 | 11.0 | 11.0 | 11.0 | 10.0 | 10.0 | 10.0 | 8.0 | 11.0 |
| Water-washing prior to drying | No | No | No | Yes | Yes | Yes | Yes | Yes | Yes | No | No | No | No | No |
| Thermal treatment conditions |  |  |  |  |  |  |  |  |  |  |  |  |  |  |
| Drying (80° C., 20 min) | Yes | Yes | Yes | Yes | Yes | Yes | Yes | Yes | Yes | Yes | Yes | Yes | Yes | Yes |
| Heating (120° C., 20 min) | — | — | Yes | — | — | — | — | — | — | Yes | Yes | Yes | — | — |
| Multivalent metal/bonded methacrylic acid (molar ratio) | 0.40 | 0.46 | 0.47 | 0.46 | 0.71 | 1.28 | 0.39 | 0.59 | 0.58 | 0.53 | 0.44 | 0.50 | 0.11 | — |
| (Properties of dip molding) |  |  |  |  |  |  |  |  |  |  |  |  |  |  |
| Stress at 300% elongation (MPa) | 2.5 | 2.8 | 2.9 | 3.4 | 2.8 | 2.3 | 4.4 | 2.3 | 2.4 | 6.2 | 3.5 | 5.2 | 0.9 | 1.3 |
| Tensile strength (MPa) | 24.5 | 27.3 | 27.5 | 45.6 | 39.8 | 28.4 | 43.5 | 35.2 | 35.8 | 28.4 | 24.3 | 23.7 | 4.5 | 3.5 |
| Transparency of rubber glove* | Trsp | Trsp | Trsp | Trsp | Trsp | Trsp | Trsp | Trsp | Opq | Opq | Cldy | Opq | Trsp | Trsp |
| Number of pinholes (holes) | 3 | 2 | 2 | 1 | 1 | 0 | 1 | 0 | 7 | 38 | 20 | 28 | — | — |

*Trsp: transparent, Opq: cloudy opaque, Cldy: cloudy

The following was found from the results shown in Table 2.

A dip molding obtained from a composition for dip molding comprising sulfur, a vulcanization accelerator, and zinc oxide had comparatively good feel and good tensile strength, but had a very large number of pinholes (Comparative Example 1).

A dip molding containing no zinc oxide and obtained by sulfur vulcanization had good feel, but had low tensile strength and a large number of pinholes (Comparative Example 2).

A dip molding obtained from a composition for dip molding containing neither sulfur nor a vulcanization accelerator had comparatively good feel but had low tensile strength and quite a large number of pinholes (Comparative Example 3).

A dip molding obtained from a composition for dip molding which did not contain sulfur, a vulcanization accelerator or zinc oxide and whose pH was less than the range specified in the present invention had excellent feel but had very low tensile strength and was not suitable as a dip molding (Comparative Example 4).

A dip molding obtained from a conjugated diene based rubber latex in which an ethylenically unsaturated acid monomer was not copolymerized had excellent feel but had very low tensile strength and was not suitable as a dip molding (Comparative Example 5).

In comparison with these comparative examples, the dip moldings obtained from the compositions for dip molding as specified in the present invention had excellent feel, excellent tensile strength, a very small number of pinholes. The dip moldings of Examples 1 to 8 were transparent, but it is expected that a colored molding could easily be produced, if desired.

When Examples 2 and 3 are compared, it is found that a dip molding having a sufficient tensile strength can be obtained without a thermal treatment, which is necessary for vulcanization.

Water-washing prior to drying gave dip moldings having excellent feel and outstandingly improved tensile strength (Examples 4 to 9).

INDUSTRIAL APPLICABILITY

The dip molding of the present invention has very few pinholes, good feel, and adequate strength. A transparent dip molding can also be obtained easily. The composition for dip molding of the present invention is suitable as a starting material of the production of the dip molding, and the production method of the present invention can produce the dip molding with high productivity.

The invention claimed is:

1. A dip molding molded from a conjugated diene based rubber latex obtained by copolymerization of a conjugated diene monomer and an ethylenically unsaturated acid monomer, wherein the dip molding is crosslinked by a water-soluble multivalent metal salt, and molding is carried out using substantially none of any of a sulfur-containing vulcanizing agent, a vulcanization accelerator for the vulcanizing agent, and zinc oxide, and wherein based on 100 parts by weight of the solids portion of the conjugated diene based rubber latex, the sulfur-containing vulcanizing agent is at most 0.4 parts by weight, the vulcanization accelerator for the vulcanizing agent is at most 0.4 parts by weight, and the zinc oxide is at most 0.7 parts by weight wherein the dip molding has a tensile stress at 300% elongation of less than 4.5 MPa and a tensile strength of 20 MPa or more.

2. The dip molding according to claim 1 wherein the conjugated diene based rubber latex is obtained by copolymerization of 30 to 90 wt % of the conjugated diene monomer, 0.1 to 20 wt % of the ethylenically unsaturated acid monomer, and 0 to 69.9 wt % of an additional ethylenically unsaturated monomer that can copolymerize with these monomers.

3. The dip molding according to claim 1 wherein, based on 100 parts by weight of the solids portion of the conjugated diene based rubber latex, the sulfur-containing vulcanizing agent is at most 0.2 parts by weight, the vulcanization accelerator for the vulcanizing agent is at most 0.2 parts by weight, and the zinc oxide is at most 0.3 parts by weight.

4. The dip molding according to claim 1 wherein the molding is carried out using none of any of the sulfur-containing vulcanizing agent, the vulcanization accelerator for the vulcanizing agent, and the zinc oxide.

5. The dip molding according to claim 1 wherein the ratio of the number of moles of the multivalent metal originating from the water-soluble multivalent metal salt used relative to the number of moles of the acid group of the bonded ethylenically unsaturated acid in the conjugated diene based rubber latex is 0.2 to 1.5.

6. A composition for dip molding, the composition comprising a conjugated diene based rubber latex obtained by copolymerization of a conjugated diene monomer and an ethylenically unsaturated acid monomer, wherein the composition has a pH of at least 8.5, and contains substantially none of any of a sulfur-containing vulcanizing agent, a vulcanization accelerator for the vulcanizing agent, and zinc oxide, and wherein based on 100 parts by weight of the solids portion of the conjugated diene based rubber latex, the sulfur-containing vulcanizing agent is at most 0.4 parts by weight, the vulcanization accelerator for the vulcanizing agent is at most 0.4 parts by weight, and the zinc oxide is at most 0.7 parts by weight.

7. The composition for dip molding according to claim 6 wherein the pH is 9.5 to 13.

8. A method for producing a dip molding comprising a step of adhering to a dip molding mold a latex coagulating agent comprising a water-soluble multivalent metal salt, a step of forming a dip molding layer on the surface of the mold by immersing the mold in a composition for dip molding comprising a conjugated diene based rubber latex obtained by copolymerization of a conjugated diene monomer and an ethylenically unsaturated acid monomer, the composition having a pH of at least 8.5 and containing substantially none of any of a sulfur-containing vulcanizing agent, a vulcanization accelerator for the vulcanizing agent, and zinc oxide, and a step of detaching the dip molding layer after drying, in that order, and wherein based on 100 parts by weight of the solids portion of the conjugated diene based rubber latex, the sulfur-containing vulcanizing agent is at most 0.4 parts by weight, the vulcanization accelerator for the vulcanizing agent is at most 0.4 parts by weight, and the zinc oxide is at most 0.7 parts by weight.

9. The method for producing a dip molding according to claim 8 further comprising a step of water-washing the dip molding layer prior to drying the dip molding layer.

* * * * *